United States Patent

[11] 3,607,081

[72] Inventor Harry Goldenberg
Santa Monica, Calif.
[21] Appl. No. 849,202
[22] Filed Aug. 11, 1969
[45] Patented Sept. 21, 1971
[73] Assignee The Dow Chemical Company
Midland, Mich.

[54] REAGENT FOR DETERMINATION OF GLOBULIN
10 Claims, No Drawings

[52] U.S. Cl. .................................................. 23/230 B,
252/408
[51] Int. Cl. ...................................................... C09k 3/00,
G01n 21/02
[50] Field of Search .................................... 23/230 B,
253; 252/408; 424/11

[56] References Cited
UNITED STATES PATENTS
3,095,277 6/1963 Free et al. ........................ 23/253
3,121,612 2/1964 Nicholls et al. ................. 23/230

OTHER REFERENCES
Henry et al., " Interferences With Biuret Methods for Serum Proteins," Analytical Chemistry, vol. 29, No. 10, October 1957, PP 1491– 1495.

Primary Examiner—Morris O. Wolk
Assistant Examiner—R. E. Serwin
Attorneys—Griswold & Burdick, John L. Spalding and Maynard R. Johnson ABSTRACT: A stable reagent for the determination of globulins in biological fluids comprises a solution of glyoxylic acid and a cupric salt such as cupric sulfate pentahydrate in a mixture of acetic acid and sulfuric acid. The reagent has improved stability, sensitivity and specificity properties and can be employed for rapid determination of globulin. Methods of preparing the reagent and using it in the determination of globulins are disclosed.

REAGENT FOR DETERMINATION OF GLOBULIN

BACKGROUND OF THE INVENTION

1. Field of the Invention

The invention is directed to a reagent composition and a method useful for the determination of globulins in biological fluids such as serum, plasma, cerebrospinal fluid or the like.

2. Description of the Prior Art

The biuret reaction has often been employed in determination of specific protein fractions, including globulin, after fractionation of the protein in biological fluids. The fractionation is carried out as a separate step by any technique capable of giving the desired separation of globulins from the remainder of the protein. Electrophoretic separation techniques such as starch gel, agar gel or paper electrophoresis provide excellent separation of fractions; however, such procedures require extensive and costly apparatus, and considerable time and skill is required for the separation.

Salt fractionation has been employed to determine globulins in serum by the biuret reaction. In this technique, the globulins are precipitated with sodium sulfite leaving the albumins in solution. The albumin concentration can be determined by the biuret reaction and the globulin concentration determined by the difference between the albumin concentration and the total protein concentration as determined by a biuret reaction procedure on the unfractionated material. Alternately, the precipitated globulins can be redissolved separately and determined by the biuret reaction. The salt fractionation technique of Wolfson, Cohn et al., American Journal of Clinical Pathology, Technical Section, 18, 723 (1948) is an accepted procedure of this type and gives results comparable to those involving electrophoresis. Henry, Clinical Chemistry: Principles and Techniques, pages 207–211, Harper & Rowe, New York (1964).

None of the prior art procedures has been entirely satisfactory. It would be desirable to provide a reagent and method which would permit the determination of globulin in a single sample containing other proteins such as albumin without requiring fractionation, electrophoresis or the like. It would also be desirable to provide a reagent and method for the determination of globulin in biological fluids which is sufficiently sensitive and specific to permit direct determinations on unmodified fluids without interference by colors due to other substances such as bilurubin. It would also be desirable to provide a globulin reagent and method which can provide results comparable to those obtained when electrophoresis or salt fractionation steps are included.

SUMMARY OF THE INVENTION

This invention is directed to a novel single reagent for the determination of globulins in biological fluids and to a method for using the same.

It is an object of this invention to provide a single reagent for the determination of globulin in biological fluids such as serum or plasma or the like which can be prepared well in advance of its use and which remains stable for long periods of time. Another object of this invention is to provide a reagent and method which produces a specific measurable color from globulins so that the color measurement can be made without interference by color due to the presence of other substances such as bilirubin and the like. A further object is to provide a reagent and method which produces a measurable color with globulin in the presence of other proteins so that the quantitative results obtained are comparable to those obtained by prior art methods involving electrophoresis or salt fractionation of the biological fluid sample. Other objects and advantages of the present invention will be apparent on consideration of the following description and claims.

The reagent for use in the determination of globulins in accordance with the invention comprises glyoxylic acid, acetic acid, cupric ion, and sulfuric acid. More particularly, the reagent comprises a colorimetric amount of glyoxylic acid and a sensitizing amount of cupric ion dispersed in a mixture of acetic acid and sulfuric acid.

The novel reagent composition forms a colored product when mixed with globulins. The ingredients of the reagent composition cooperate to disperse globulins contained in a sample throughout the reagent composition and to facilitate the formation of the colored product. Thus, the reagent composition can be employed to determine the presence or absence of globulins in biological fluids. The intensity of the color formed by admixture of the reagent composition of the invention with globulins or a biological fluid containing the same is proportional to the amount of globulins present. Thus, the color can be measured to give an accurate, rapid quantitative measurement of globulin concentration. In addition, the reagent is specific for globulins and extremely sensitive, permitting quantitative analyses for globulins to be performed directly on biological fluids containing other proteins without substantial interference by colors due to the presence of other proteins or substances such as bilirubin. Moreover, the novel reagent composition is stable in storage for substantial periods of time. Use of the color reagent to determine concentrations of globulins gives accurate results which are comparable to those obtained with methods requiring substantially more time for analysis and requiring additional analytical separation procedures such as electrophoresis or salt fractionation of the sample. The globulin reagent and method of the invention can also be employed in automated analytical procedures.

In preparing the reagent composition of the invention, the glyoxylic acid and a copper salt such as cupric sulfate, cupric acetate or other cupric salt suitable for supplying the cupric ion are dispersed in glacial acetic acid in any order or fashion. The sulfuric acid is then mixed with the resulting composition. In a preferred procedure, all the acids as well as the copper salt are reagent grade materials.

In a convenient procedure, a portion of the glacial acetic acid is mixed with a solution of a copper salt such as cupric sulfate in water, and glyoxylic acid monohydrate is added to the acidic mixture. Sulfuric acid is thereafter mixed with the organic acid solution of the copper salt and the mixture is cooled. Additional amounts of glacial acetic acid are then added to the mixture to obtain a composition having the desired proportions of ingredients. In a preferred procedure, the sulfuric acid is added slowly with stirring or agitation and the mixture is cooled in an ice bath during the addition. The reagent thus prepared is stable for periods of several months when stored under refrigeration.

The presence of a colorimetric amount of glyoxylic acid in the reagent composition is critical and essential to the use of the composition in globulin determination. Sufficient glyoxylic acid must be present in the ultimate reagent composition so that a measurable color is produced when the reagent composition is mixed with globulins or a biological fluid containing the same. For quantitative determinations, it is essential that the glyoxylic acid be employed not only in an amount sufficient to provide a detectable color, but also in an amount which is sufficient so that a colored product is formed with all the globulins present, thus providing an intensity of color proportional to the amount of globulin. The ultimate mixture for quantitative determinations thus comprises acetic acid, sulfuric acid, the cupric ion, a minor amount of globulin and an amount of glyoxylic acid sufficient to provide an intensity of color substantially proportional to the amount of globulin. In the present specification and claims, the phrase "colorimetric amount" is employed to designate that concentration of glyoxylic acid in the composition which provides a measurable color with globulin, the intensity of said color being substantially proportional to the amount of globulin. When insufficient glyoxylic acid is employed, qualitative results can be obtained, but the quantity of globulins in excess over that required to form the colored product is not measured. In particular applications, whether or not a colorimetric amount of glyoxylic acid has been employed can be determined by the simple expedient of measuring the color produced with varying amounts of globulin. The reagent and sample are preferably mixed to provide an excess of glyoxylic acid over that required for formation of a colored product to ensure that the intensity of color is limited only by globulin concentration and not by the concentration of glyoxylic acid. The use of such an excess of glyoxylic acid ensures that the intensity of color is proportional to the amount of globulin.

The presence of a sensitizing amount of cupric ion in the reagent composition is also critical and essential to the use of the reagent in direct determinations of globulin. Sufficient of the cupric ion must be present in the ultimate reagent composition so that the color produced in the reaction of globulin with the other ingredients is detectably increased in intensity. The increased intensity in color permits the use of the reagent in quantitative determinations employing very small amounts such as 0.05 to 1.0 milligram of globulin, even in the presence of other proteins, bilirubin and biuret reagents or the like. Both the colored reaction product and the cupric ion absorb light of similar wavelengths. Thus, concentration of cupric ion must not be so great to obscure the color formed with globulin. In the present specification and claims, the term "sensitizing amount" of cupric ion is employed to designate that concentration of cupric ion which detectably enhances the color produced in the reaction with globulins and thus significantly increases the sensitivity of the glyoxylic acid to small amounts of globulin without creating sufficient cupric ion color to obscure the desired globulin reagent color. In particular applications, the desirable sensitizing amount of cupric ion to be employed can be ascertained by comparing the intensity of color obtained when reagent compositions containing varying amounts of cupric ion are mixed with small amounts of globulin, such as from 0.01 to 0.1 or more milligrams of globulin per milliliter of ultimate mixture. The amount of cupric ion should be insufficient to give the reagent alone a depth of color due to cupric ion equivalent to an absorbance of more than about 0.2 for light of a wavelength from 480 to 600 millimicrons. When the reagent alone, without the addition of globulin, has an absorbance substantially greater than about 0.2, the cupric ion color can obscure the globulin reagent color, making the reagent less sensitive to low globulin concentrations.

The cupric ion is preferably employed together with sufficient water to maintain the cupric ion in solution in the ultimate reagent composition during storage periods of one month or more. Generally, a solution of a cupric salt such as cupric acetate, cupric sulfate or cupric sulfate pentahydrate in water at a concentration of about 0.5 to about 2 percent by weight provides the cupric ion in a convenient form for use in formulating the reagent. The presence of such amounts of water does not alter the relative proportions of cupric ion, glyoxylic acid, acetic acid and sulfuric acid, thus the reagent composition can be characterized as a dispersion of the required amounts of glyoxylic acid and cupric ion in a mixture of sulfuric acid and acetic acid, whether or not the cupric ion is supplied as an aqueous solution. In a preferred composition the cupric ion is present as a solution of cupric sulfate.

Good results are obtained with reagent compositions containing a colorimetric amount of glyoxylic acid at concentrations of from about 0.01 to about one percent (weight in grams of glyoxylic acid by volume in milliliters of the ultimate reagent mixture) and with a sensitizing amount of cupric ion equivalent to from about 0.04 percent (weight in grams of cupric sulfate pentahydrate by volume in milliliters of ultimate reagent) to sufficient cupric ion to provide an optical density at 480–600 millimicrons of about 0.2 in the ultimate mixture. Generally, cupric ion concentrations equivalent to from about 0.04 to about 0.2 percent (weight in grams by volume in milliliters) of cupric sulfate pentahydrate in the ultimate mixture are preferred.

The liquid acid ingredients can be present in the reagent in approximately the amounts given below:
 Acetic acid from about 80 to about 99 parts by volume; and
 Sulfuric acid from 1 to about 20 parts by volume.
When quantitative determinations of total protein as well as globulins are desired, the liquid acid ingredients are preferably present as a mixture containing from about 5 to about 15 percent by volume of sulfuric acid in the acetic acid. Preferably, the reagent composition is formulated employing the following ingredients in the following ranges of proportions:
 Sulfuric acid from about 5 to about 10 parts by volume;
 Glacial acetic acid from about 80 to about 95 parts by volume;
 Glyoxylic acid from about 0.02 to about 0.15 percent (weight in grams by volume in milliliters of ultimate composition); and
 Cupric sulfate pentahydrate from about 0.04 to about 0.2 percent (weight in grams by volume in milliliters of ultimate composition), conveniently employed as a solution in sufficient water to provide from about 5 to about 10 parts of water per hundred parts by volume of ultimate composition.

In the qualitative or quantitative determination of globulin with the reagent of the invention, the reagent is mixed with a sample, generally a biological fluid or a globulin-containing substance such as a standard solution. In quantitative operations, the reagent is mixed with a minor amount of a biological fluid containing globulin. The biological fluid can be an extract, as from a tissue homogenate or the like, or it can be an animal body fluid such as blood, plasma, serum, lymphatic fluid, bile, cerebrospinal fluids or the like. The biological fluid can be employed directly as a sample or it can be treated by conventional procedures such as dilution, concentration, filtration, centrifugation, extraction or the like.

In one useful embodiment, the reagent of the invention is mixed with a biuret reaction mixture comprising a biological fluid and sufficient of a biuret reagent to provide a color proportional to the concentration of protein therein. The biuret reagent can be any of the cupric sulfate reagents known to be suitable for determination of protein in biological fluids such as the reagent of Henry et al., Anal. Chem., 29, 1491 (1957). The biuret reaction mixture employed is first mixed with sufficient concentrated sulfuric acid to destroy the biuret color therein. The resulting acidified mixture is then mixed with the reagent composition of the invention, and the concentration of globulin therein is determined as described below.

In determining globulin, the reagent is mixed thoroughly with a minor proportion of the biological fluid sample, conveniently in the proportions of about one part by volume of biological fluid to about 60 to about 500 parts by volume of reagent composition. When the sample is a mixture of biological fluid and biuret reagent, only the biological fluid content of the mixture should be considered, and the sample and reagent composition are mixed in such proportions as to provide less than about 12 to 15 percent of water by volume of ultimate mixture. The reagent composition and sample can be mixed in receptacles of a particular predetermined optical density or absorbance such as the tubes and cuvets conventionally employed with colorimeters or spectrophotometers, if desired. When the sample is a mixture of biological fluid and biuret reagent prepared in such a tube for determination of the total protein concentration, the same tube can be employed. In such a case, depending on the volume of the sample and the tube, it may be desirable to discard an aliquot portion of the biuret reaction mixture from the tube before adding the globulin reagent in order to avoid spillage or overfilling of the tubes.

The reagent and globulin combine at elevated temperatures of about 75° to about 100° C. to form a colored product with a depth of color proportional to the amount of globulin. The exact temperature and time for heating are not critical when only qualitative determinations are desired. However, the quantitative accuracy of the method of the invention is greatly enhanced by controlling the time and temperature. Overheating of the mixture can partially destroy the colored product and impair the accuracy of quantitative results. For rapid quantitative procedures, the mixture is heated to a temperature between about 90° and about 100° C. in from about 4 to 6 minutes after heating is begun, and the mixture is then cooled to a temperature below about 30° C. within about 3 to about 5 minutes after heating has ceased.

The heating step can be conveniently carried out by placing tubes containing the mixture of reagent and sample in a conventional tube heating block at a temperature of 100° C. for from about 4 to about 6 minutes. In a convenient procedure for cooling the mixture, the tubes are removed from the heating block and immersed in a cold water bath for from 2 to 5 minutes. Other conventional means for heating and cooling the tubes can be employed such as hot water or oil baths, ice baths and the like.

The color of the mixture can be measured by any means which will give an accurate measurement of the intensity of color. Preferably, a spectrophotometer or a colorimeter is employed. When the method is carried out in a colorimeter or spectrophotometer tube or cuvet, the mixture can then be placed in the instrument and its absorbance or transmittance determined. Otherwise, an aliquot portion of the mixture can be placed in such a tube and the intensity of color is determined in a colorimeter or spectrophotometer. In such operations, it is preferred to determine the absorbance or percent transmittance of the sample with light having a wavelength between about 520 millimicrons and 600 millimicrons. When the sample is a mixture of biological fluid and biuret reagent prepared for determination of total protein, it is convenient to employ the same colorimeter or spectrophotometer and light of the same wavelength employed in any prior total protein determination. The amount of globulin present in the sample can then be determined by a comparison of the percent transmittance or absorbance observed for the sample with the measurements obtained when samples containing known amounts of globulin are employed, or with conversion charts or tables prepared from such data.

In making the colorimeter or spectrophotometer determinations, it is desirable to employ the readings obtained on the color reagent alone and in the absence of any globulin and to thus measure the difference in absorbance (optical density) or percent transmittance between the sample and the pure reagent (reagent blank).

It is also desirable to employ a globulin standard when employing the reagent of the invention to determine the amount of globulin present in a sample of biological fluid. In a typical procedure, a standard composition is prepared to contain a known amount of globulins, and this composition is mixed with the reagent in the same predetermined proportions and treated in the identical procedure as the sample of biological fluid containing an unknown amount of globulins. For best results, the globulins employed should originate from the same species as the biological fluid. Thus, for analysis of bovine fluids, a bovine globulin standard should be used or for human fluids, a human globulin standard should be used. The simultaneous use of a globulin standard substantially eliminates the effect of procedural deviations. The employment of the standard also permits the calculation of globulin concentration in the sample of biological fluid by comparison of the readings obtained with the standard and the sample. When the globulin determination is to be made in the same tube as a total protein determination, it is convenient to use a single-tube containing both globulin and other protein to serve as a protein standard for the biuret reaction and also as a globulin standard.

In a convenient procedure, each sample or group of samples to be analyzed, a globulin standard or protein and globulin standard and a reagent blank composition comprising the reagent alone are treated simultaneously. Additional biological fluid sample tubes can be prepared, so long as all tubes can be heated and cooled at the same temperatures simultaneously. The intensity of color for the globulin standard and the sample tubes is then measured, taking account of the reagent blank, and the concentration of globulins in the sample is obtained by comparing the intensity of color in the sample tube with the intensity of color produced by the known concentration of globulin in the standard.

DESCRIPTION OF THE PREFERRED EMBODIMENTS

The following examples illustrate the present invention but are not to be construed as limiting the same.

EXAMPLE 1

One gram of cupric sulfate pentahydrate is dissolved in 90 milliliters of water. 400 Milliliters of glacial acetic acid are then added to the solution, followed by one gram of glyoxylic acid monohydrate, and the resulting mixture is stirred. 60 bmilliliters of concentrated sulfuric acid is added slowly with stirring and the resulting mixture is cooled to room temperature. An additional quantity of glacial acetic acid is then added to provide a total volume of 1,000 milliliters. The resulting reagent composition is stirred and mixed well and employed in the determination of globulin.

Other globulin reagent compositions can be similarly prepared in accordance with the procedure described above by employing cupric acetate or anhydrous cupric sulfate in lieu of the cupric sulfate pentahydrate. The compositions can be mixed directly with biological fluids in the determination of globulin, or they can be employed together with additional sulfuric acid sufficient to destroy biuret color in determining globulin concentration in a mixture of biological fluid and biuret reagent.

For example, in substantially the same procedure as described above, a reagent composition is prepared by dissolving two grams of cupric sulfate in 80 milliliters of water, adding 450 milliliters of glacial acetic acid, mixing the solution with 0.25 gram of glyoxylic acid, mixing the resulting solution with 50 milliliters of sulfuric acid and thereafter cooling the solution and mixing the solution with an additional 420 milliliters of glacial acetic acid.

In substantially the same procedure, a reagent composition is prepared by dissolving 0.6 gram of glyoxylic acid in 800 milliliters of glacial acetic acid, adding the solution to 100 milliliters of a 0.5 percent (weight by volume) aqueous solution of cupric acetate monohydrate, chilling the resulting solution and mixing the solution thoroughly with 100 milliliters of sulfuric acid.

In substantially the same procedure, 0.8 gram of glyoxylic acid monohydrate are dissolved in 600 milliliters of glacial acetic acid. 85 Milliliters of an aqueous solution containing 1.5 percent (weight by volume) of cupric sulfate are added to the mixture and dispersed therein. The resulting solution is chilled in an ice bath and 50 milliliters of sulfuric acid are mixed therewith. The mixture is then diluted to a total volume of 1,000 milliliters with glacial acetic acid and mixed well to prepare a reagent composition.

EXAMPLE 2

4.0 Milliliters of the first above-described reagent of example 1 are placed in each of three photometer tubes, A, B and C. 0.020 Milliliters of human serum containing an unknown amount of globulin are added to tube A. 0.020 Milliliter of a serum standard known to contain 2.7 grams of human globulins per 100 milliliters of standard serum is added to tube B to provide a globulin standard. No serum or protein solution is added to tube C and tube C is employed as a reagent blank. The mixtures in tubes A and B are mixed thoroughly by shaking 20 times (about 10 seconds). Tubes A and B are then simultaneously placed in a heating block set at 100° C. and heated for 5 minutes, at which time the temperature in each tube is approximately 97°–100° C. The tubes are then removed simultaneously and immersed in a cold water bath for 3 minutes, during which time the temperature of the contents of each tube is lowered to about 25° C. The tubes are removed from the water, dried and the contents of each tube are mixed by inverting the tube several times. Tube C is placed in a colorimeter with a filter for light having a wavelength of 540 millimicrons and the indicating device on the colorimeter is set to read zero absorbance for tube C, the reagent blank.

The absorbances of tubes A and B are then determined on the colorimeter and recorded. The concentration of globulin in the sample in grams of globulin per 100 milliliters of sample is calculated by multiplying the absorbance of the sample (tube A) by 2.7 and dividing the product by the absorbance of the globulin standard (tube B).

The same procedure described above is carried out with 0.020 milliliters of human plasma as the sample rather than with serum. The difference between the result obtained for plasma less the globulin concentration of the serum is recorded in fibrinogen concentration.

The results obtained are in excellent agreement with the results obtained by determination of globulin on identical serum and plasma samples by the salt fractionation method of Wolfson, Cohn et al.

EXAMPLE 3

42 samples of human serum are collected each of which is divided into two identical portions to provide two separate series, I and II, of serum samples, and each of which contains an unknown concentration of protein, and an unknown concentration of globulin. The serum samples of Series I are analyzed for globulin concentration by the procedure of example 2, employing the first above-described reagent composition of example 1.

The serum samples of series II are analyzed for globulin concentration as determined by the salt fractionation procedure of Wolfson, Cohn et al., Am. J. Clin. Path., 18, 723 (1948). The globulin concentration results are compared with those obtained in series I.

Excellent agreement is observed between the results obtained in series I with the method and composition of the invention and the results obtained in series II by the art method.

EXAMPLE 4

In other determinations, the method and reagent employed in example 2 are employed to compare samples of human serum containing known amounts of globulin and albumin with samples containing the same amount of globulin and albumin to which bilirubin has been added in known amounts. No significant difference in intensity of color is observed between the serum samples and the samples containing added bilirubin. The results of determinations of globulin concentration are substantially the same for both sets of samples. These determinations indicate that no interference by bilirubin is observed at concentrations of 20 milligrams of bilirubin per 100 milliliters of sample.

EXAMPLE 5

In other determinations, the reagent and method employed in example 2 are employed to compare the globulin concentration of samples containing known amounts of serum protein with identical samples containing the same amount of proteins to which known amounts of globulin have been added. The results obtained are consistent with the concentration of globulin known to be present by addition of the known amounts to the samples.

EXAMPLE 6

The precision of the determination of total protein and of globulin from one determination to the other is evaluated with the method and reagent composition of example 2. The evaluations are carried out by making determinations on samples containing different levels of globulins between about 2 and about 8 grams per 100 milliliters of sample. In these operations, two consecutive determinations are carried out on 42 pairs of identical samples. Statistical treatment of the data indicates excellent precision of the method from one determination to another.

EXAMPLE 7

The precision and repeatability of the determination of globulin from one determination to the other is evaluated with the method and reagent of example 4. The evaluations are carried out by making 20 consecutive determinations of identical samples containing levels of globulins between about 2.9 and 3.9 grams per 100 milliliters of sample. Statistical treatment of the data indicates excellent precision and repeatability of results from one determination to another.

What is claimed is:

1. A composition useful for the determination of globulin comprising a colorimetric amount of glyoxylic acid and a sensitizing amount of cupric ion dispersed in a mixture containing from about 1 to about 20 percent by volume of sulfuric acid in acetic acid.
2. The composition of claim 1 further comprising a biological fluid.
3. The composition of claim 1 wherein the cupric ion is in the form of cupric sulfate.
4. The composition of claim 1 further comprising globulin.
5. The composition of claim 4 wherein the globulin is present in an amount sufficient to form a detectable color therein, the intensity of such color being proportional to the concentration of globulin.
6. A method useful for determination of globulin comprising:
    a. mixing a minor amount of a biological fluid with a reagent composition comprising a colorimetric amount of glyoxylic acid and a sensitizing amount of cupric ion dispersed in a mixture containing from about 1 to about 20 percent by volume of sulfuric acid in acetic acid; and
    b. thereafter heating the mixture to a temperature of from about 75° to about 100° C. in from about 4 to about 6 minutes after the commencement of heating.
7. The method of claim 6 wherein the cupric ion is in the form of cupric sulfate.
8. The method of claim 6 wherein the mixture is heated to a temperature of from about 90° to about 100° C.
9. The method of claim 6 further comprising the step of cooling the heated composition to a temperature of less than about 30° C. within from about 3 to about 5 minutes after the termination of heating.
10. The method of claim 6 wherein the biological fluid is serum.